(12) United States Patent
Sukhyani

(10) Patent No.: US 11,340,753 B2
(45) Date of Patent: May 24, 2022

(54) DYNAMIC USER-DEFINED APPLICATION LEVERAGING LOCAL SERVICE-ORIENTED ARCHITECTURE TO SHARE MOBILE APPLICATION FEATURES

(71) Applicants: Atlassian Pty Ltd., Sydney (AU); Atlassian Inc., San Francisco, CA (US)

(72) Inventor: Kapil Sukhyani, Fremont, CA (US)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 0 days.

(21) Appl. No.: 17/039,300

(22) Filed: Sep. 30, 2020

(65) Prior Publication Data
US 2022/0100326 A1 Mar. 31, 2022

(51) Int. Cl.
*G06F 3/0481* (2022.01)
*G06Q 30/06* (2012.01)
*G06F 9/451* (2018.01)
*G06F 3/04842* (2022.01)

(52) U.S. Cl.
CPC ........ *G06F 3/0481* (2013.01); *G06F 3/04842* (2013.01); *G06F 9/451* (2018.02); *G06Q 30/0641* (2013.01)

(58) Field of Classification Search
CPC .............................. G06F 3/0481; G06F 9/451
See application file for complete search history.

(56) References Cited

U.S. PATENT DOCUMENTS

| | | | |
|---|---|---|---|
| 2004/0230489 A1* | 11/2004 | Goldthwaite | G06Q 20/32 705/26.1 |
| 2006/0015818 A1* | 1/2006 | Chaudhri | G06F 3/0482 715/779 |
| 2013/0263053 A1* | 10/2013 | Tritschler | G06F 3/0481 715/835 |

* cited by examiner

*Primary Examiner* — Mong-Shune Chung
(74) *Attorney, Agent, or Firm* — Brownstein Hyatt Farber Schreck, LLP

(57) ABSTRACT

The case is directed to portable or client devices that are adapted to instantiate a client application that is communicably coupled to one or more remote host services. The client application is also adapted to cause a display of a graphical user interface having various regions. A first interface region of the graphical user interface may be associated with a first microfunction installed on the device and a second region may be associated with a second microfunction installed on the device. The various microfunctions may enable the client application to interface with one or more remote host services and may be shared across different client applications. In some cases, multiple microfunctions are used to define a custom, user-defined integrated application.

17 Claims, 11 Drawing Sheets

DYNAMIC USER-DEFINED APPLICATION LEVERAGING LOCAL SERVICE-ORIENTED ARCHITECTURE TO SHARE MOBILE APPLICATION FEATURES

TECHNICAL FIELD

The described embodiments relate generally to dynamically customizable software applications. More particularly, the present embodiments relate to a customizable or user-defined application for a mobile device, the application configured to aggregate, and facilitate access to, user-selected or application-selected microservices or microfeatures provided by other applications or services executing on, or otherwise accessible to, that mobile device.

BACKGROUND

Traditionally, a software application is made available to a user through a vendor or virtual software marketplace like the App Store or Google's Play Store. The software application may be customized for a particular platform (e.g., iOS or Android OS) but otherwise provides fixed or uniform functionality across all platforms. One potential issue with traditional mobile software applications is that the software applications generally cater to average, or otherwise common, use cases and feature sets, and typically do not highlight or provide easy access to functionality best suited to each user. In an attempt to include a broad range of functionality, developers may include more functionality than the typical user wants or needs, resulting in large applications that unnecessarily consume limited memory and/or processing resources of the mobile device.

SUMMARY

Some example embodiments are directed to portable or client devices that are adapted to instantiate a client application that is communicably coupled to one or more remote host services. The client application is also adapted to cause a display of a graphical user interface having various regions. A first interface region of the graphical user interface may be associated with a first microfunction installed on the device and a second region may be associated with a second microfunction installed on the device. The various microfunctions may enable the client application to interface with one or more remote host services and may be shared across different client applications. In some cases, multiple microfunctions are used to define a custom, user-defined integrated application.

Some example embodiments are directed to a portable electronic device that includes a display configured to render a graphical user interface, a persistent memory storing an executable asset, and a processor operably coupled to the memory and configured to access the memory to load at least a portion of the executable asset into a working memory to at least partially instantiate an instance of a client application, the client application instance configured to communicably couple to a remote host service. The client application is configured to display a first interface region of the graphical user interface. The first region may be associated with a first microfunction installed on the portable electronic device. The client application may also be configured to display a second interface region of the graphical user interface. The second region may be associated with a second microfunction installed on the portable electronic device. The client application may also receive a user input at the first interface region of the graphical user interface, and, in response to the user input, request the first microfunction to provide a function. The client application may receive a first response from the first microfunction and submit a request to the remote host service based on the first response from the first microfunction. The graphical user interface may be updated based at least in part on the first response from the first microfunction and a second response received from the remote host service.

In some cases, the function provided by the microfunction is a database function. In some cases, the function provided by the microfunction is a shopping cart function. In some cases, the function provided by the microfunction comprises the microfunction communicably coupling to the remote host service.

In some cases, the client application instance is a first client application instance, the executable asset is a first executable asset, and the remote host service is a first remote host service. The processor may be configured to access the memory to load at least a portion of a second executable asset into the working memory to at least partially instantiate an instance of a second client application. The second client application instance may be configured to communicably couple to a second remote host service and configured to: communicably couple to the microfunction; and request the microfunction to provide the function to the second client application instance.

In some cases, the client application instance is configured to operate as one of a group comprising one or more of: an issue tracking tool; a collaborative work tool; a documentation tool; or a messaging tool.

Some example embodiments are directed to a portable electronic device comprising: a memory allocation configured to store executable assets; and a processor allocation operably coupled to the memory allocation and configured to access the memory allocation to load at least a portion of the at least three executable assets into a working memory allocation of the memory allocation to instantiate: a first client application configured to couple to a first host service; a second client application configured to couple to a second host service; and a user-configurable application coupled to the first client application and the second client application. The user-configurable application is configured to: generate a first request to the first client application for first data; generate a second request to the second client application for second data; and render a graphical user interface comprising a third data based at least in part from the first data and the second data.

In some cases, the first data comprises financial data stored by the first host service; the second data comprises financial data stored by the second host service; and the third data comprises a sum of the first data and the second data.

In some cases, the user-configurable application is configured to communicably couple to a third host service to receive fourth data, and the third data is based at least in part on the first data, the second data, and the fourth data. In some cases, at least one of the first data or the second data has a datatype selected by a user of the portable electronic device.

Some example embodiments are directed to a method of reducing redundant resource allocations in portable electronic devices. The method may include: creating a microfunction instance defined by a configuration file, the microfunction instance configured to provide a service; instantiating a first client application; communicably coupling the first client application instance to the microfunction instance; instantiating a second client application; communicably coupling the second client application instance to the microfunction instance; and executing the microfunction instance to provide the function to both the first client application instance and the second client application instance.

The function may be a shopping cart function. The function may be a database function and the database function may include a connection to a secure database. The function may include communicably coupling to a remote host service and obtaining data from the remote host service. In some cases, the function is a social media service. In some cases, the function is a messaging service. In some cases, at least one of the first client application instance and the second client application instance is configured to communicably couple to a remote host service. The microfunction instance may be instantiated within a container executing over bare metal.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
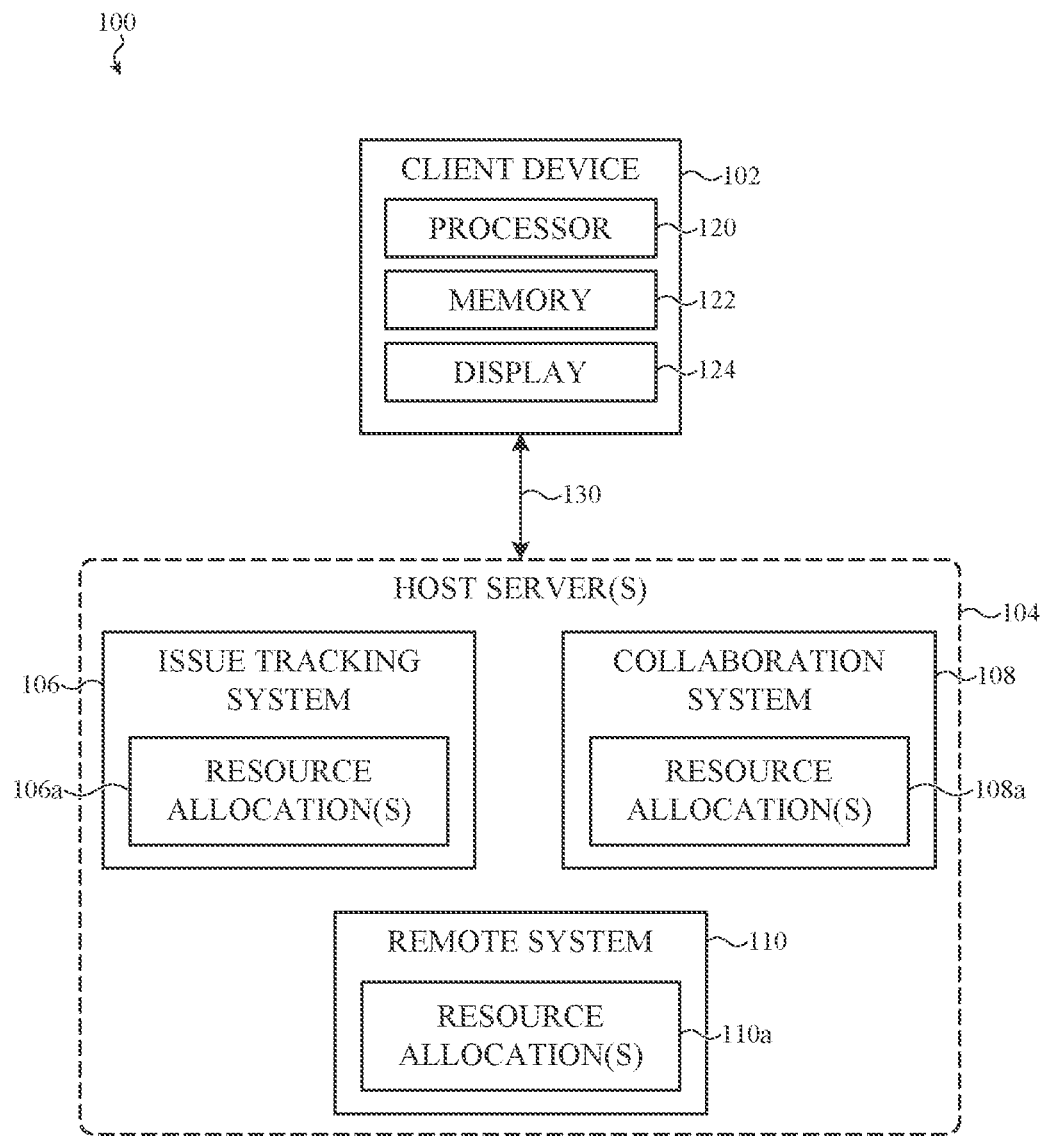
FIG. 1 depicts a system for providing a user-defined integrated application.

Embodiments described herein reference systems and methods for creating a dynamic, user-defined software application that can be deployed on a mobile device or other personal electronic equipment. The described technique varies from some traditional mobile applications in which the application (or "app") is configured for a particular platform (e.g., iOS or Android) but is otherwise uniform across platforms and installations. While this technique can provide a standard set of features that may be useful for many users, there is little or no ability to customize the applications for a particular user's needs or use cases.

Alternatively, some software developers may provide different versions of the same application, each version providing different functionality tailored to different end-user use cases. However, offering and supporting a variety of versions of the same application may consume computer and server resources of the software provider or application server while still failing to provide a tailored set of functionality that is likely to meet the needs and satisfy the preferences of every specific user.

Additionally, the technical capabilities of each user device may vary widely depending, in part, on the particular personal electronic device (e.g., mobile phone) used by a particular user. For example, some personal devices may not have the memory, network, or processing resources to effectively execute every software application offered by a software provider or application server, making the functionality of those higher-end software applications inaccessible to the user.

Additionally, traditional applications may provide functionality that is redundant with other applications that are stored on the mobile device. For example, each application may provide its own authentication functionality, media import/export user interface, shopping cart, financial transaction interface, tracking or analytics functionally, bug reporting functionality, feature request functionality, support functionality, messaging interface, or other commonly implemented functionalities. Having multiple applications on a single mobile device that provide the same or redundant functionality consumes vital, and limited, resources of the mobile device, which, in turn, can degrade mobile device performance.

To account for the foregoing and other disadvantages and inefficiencies of conventional systems, some embodiments described herein reference a user-defined mobile software application configured to access, interface with, serve as a gateway to/from, and/or otherwise adopt one or more discrete features of other mobile applications or services of a mobile device. More simply, embodiments described here include an "integrated" application configured to aggregate microservices or microfunctions made accessible by one or more other mobile software applications operating in a local service-oriented computing environment or architecture. In a non-liming phrasing, embodiments described herein include a single application that aggregates user-selected features from other applications into a single interface. In this manner, a user can interact with, and/or consume information from, multiple mobile applications in a single interface defined by, and controlled by, the user. These embodiments provide users with particular functionality needed or preferred by that user while also ensuring that any given individual mobile application can operate effectively on the user's particular mobile device.

To facilitate the above-described feature sharing between individual mobile applications, embodiments described herein implement a local service-oriented architecture. This architecture provides a framework for sharing of individual features or functions of individual applications or services between different applications and services. Such "shared" or "sharable" features can be referred to herein as "microservices" or "microfeatures" (collectively, "microfunctions") or "serverless lambda" or "appless lambda" functions. Generally and broadly, the prefix "micro" prepended to terms or phrases used herein refers to a software instance, or collection of coupled software instances, that is specifically configured to provide a single or well-defined (and limited set) of discrete computational functions or operations. Similarly, the suffix "less" appended to terms or phrases used herein refers to a software instance or collection of coupled software instances that is decoupled from the respective root term or phrase to which "less" is appended. For example, a "serverless" function is a function or computational operation that can be performed by a high-level system agonistic to underlying physical architecture. In another example, an "appless" function or computational operation can be performed independent of whether a particular "app" is instantiated or installed on a particular computing device.

More simply, the systems and techniques described herein allow for multiple applications to use a shared set of microfunctions (which may be appless and/or serverless functions), resulting in a more efficient use of the limited processing and memory capabilities of a mobile phone or other similar portable electronic device.

This approach may provide the added benefit of an improved user experience as the user may become familiar with the operation of a particular microfunction of a particular application and may be able to access that feature with fewer inputs, and in less time, if the microfunction is provided in an integrated application adjacent to other user-relevant microfunctions or features. More generally, functionality sharing between multiple applications can simplify a user experience of operating multiple applications on the same mobile device.

For example, shared user authentication functionality or credit card validation functionality may result in a user performing information entry actions only once. More specifically, after a user enters credit card information once, that information can be leveraged by multiple applications to further reduce the use of processing and memory resources. As described herein, the use of microfunctions may provide secure and well-controlled communications with (and between) third-party systems, improving the overall data security of a mobile device and help prevent attacks or other potentially detrimental impacts caused by interactions with third-party systems.

As described herein, the user-defined application (also referred to herein as an integrated application) may include core application functionality that is unique to that application as well as one or more microfunctions (served or otherwise provided by other applications) that define a portion of the user interface and provide functionality that may be shared across a variety of other user-defined applications. As described herein, these predefined microfunctions may also be referred to as micro-application services, microfunctions, micro-service application modules, or, simply, application functions or features. As described herein, a variety of microfunctions, associated with one or more different applications, may be selected by the user and combined with other "core" or base application functionality to define what is referred to herein as an integrated application.

In some embodiments, the integrated application may include multiple microfunctions that are each associated with a full or stand-alone application. For example, the integrated application may be configured by a user to include one or more microfunctions associated with an issue tracking service or project management application.

As described herein, each microfunction may include a subset of functional operations or a module of the user interface of a corresponding full application. Using the techniques described herein, the user can select only those microfunctions that are most useful or productive in order to create a custom integrated application. These techniques also allow a user to select microfunctions that are associated with different full-version applications, which allow the user to combine functionality provided by multiple different applications in one custom integrated application so that a single user interface can be leveraged by that user to consume information, enter information, and/or interact with data associated with multiple discrete applications, services, or platforms.

Also described herein is an integrated application that may include microfunctions that are shared across a suite of different integrated applications, which may reduce redundancy and overall computing resource requirements needed to support the suite of integrated applications. For example, as described herein, an integrated application may be defined at least in part by a portion of base or core software functionality in combination with one or modules or shared functionality provided by one or more microfunctions (e.g., different ecommerce applications may include core functionality of accessing a particular merchant while also all providing the common microservice of charging a user's credit card to complete an ecommerce transaction).

For example, a microfunction can be shared among multiple applications on a single electronic device to provide a shared authentication interface, a shared electronic payment interface, a shared shopping cart interface, or may be combined with core functionality of multiple integrated applications. In this way, shared functionality or modules may be provided across applications while also providing that specific functionality within a given integrated application such that the user is able to access the shared functionality from within the given integrated application (without leaving the given integrated application).

The techniques described herein can be used to provide a suite of services for a fully custom integrated application and may be comprised primarily of microfunctions. That is, a base application that serves as a platform for various microfunctions may provide no substantial functionality of its own other than to allow for the integration and interoperability of the various microfunctions. Alternatively, a base application, also referred to herein as a service-specific application, can provide core or base functionality that is supplemented by, or enhanced by, one or more microfunctions that are installed within or integrated with the base application. For example, as described herein, a microfunction may be adapted for communication with an external payment service or system and may authorize payments on behalf of the base or service-specific application.

More generally, in some embodiments described herein, a microfunction may be leveraged in a one-to-many relationship; the microfunction can be instantiated once, and can be used by many independent applications (e.g., a single ecommerce microfunction leveraged by multiple applications). In other embodiments, a microfunction may be leveraged in a many-to-one relationship; many different independent applications' services can be aggregated and/or combined by a microfunction as described herein (e.g., different authentication systems can all authenticate a single user of a mobile device). In still other embodiments, a microfunction may be leveraged in a one-to-one relationship; a feature of a first application can be used by a second application (e.g., a user interface portion of a first app is shown in a user interface of a second app, such as an integrated app as described herein).

In addition to the benefit of providing custom or user-defined functionality, the implementation of one or more microfunctions may improve the security and/or privacy characteristics of the base or service-specific application. For example, a given microfunction may serve as a primary interface to a third-party system or network and substantially isolate remaining portions of the service-specific application from a payment transaction or payment authorization sequence. The microfunction may, thus, securely handle various items of personal data including, for example, credit card numbers, account numbers, personal identification numbers, tokens, passwords, payment address details, and other potentially sensitive personal data. As described herein, a microfunction may be standardized or uniform across various integrated applications and, thus, provide a uniform level of security for the set of integrated applications.

These and other embodiments are discussed below with reference to FIGS. 1-9. However, those skilled in the art will readily appreciate that the detailed description given herein with respect to these Figures is for explanatory purposes only and should not be construed as limiting.

FIG. 1 depicts a system for providing a user-defined integrated application. In the illustrated embodiment, the system 100 is implemented with a client-server architecture including a client device 102 that communicably couples (e.g., via one or more networking or wired or wireless communication protocols) to a host server(s) 104. It may be appreciated that other client devices may be configured in a substantially similar manner as the client device 102, although this may not be required of all embodiments and different client devices can be configured differently and/or may transact data or information with, and/or provide input(s) to, the host server(s) 104 in a unique or device-specific manner.

In many embodiments, the host server(s) 104 is configured to operate within or as a virtual computing environment that is supported by one or more physical servers including one or more hardware resources (e.g., resource allocations 106a, 108a, 110a) such as, but not limited to (or requiring) one or more of: a processor; a memory; non-volatile storage; networking connections; and the like. An example of device or hardware resources that may be included in the host server(s) 104 are described below with respect to the device 900 of FIG. 9. The host server(s) 104 can leverage such resources to instantiate a number of discrete subservices or purpose-configured modules, containers, or virtual machines each configured to perform, coordinate, serve, or otherwise provide one or more services, functions, or operations of the host server(s) 104, such as an issue tracking system 106, a collaboration system 108, or a remote system 110. The issue tracking system 106, collaboration system 108, and remote system 110 may be referred to herein as application platforms or simply platforms. As shown in FIG. 1, each platform or system including the issue tracking system 106, collaboration system 108, and remote system 110, is associated with one or more hardware resources, as indicated by resource allocations 106a, 108a, 110a, which includes one or more of: a processor; a memory; computer-readable media or other non-volatile computer storage; networking connections; and the like. An example of device or hardware resources that may be included in the issue tracking system 106, collaboration system 108, and remote system 110 are described below with respect to the device 900 of FIG. 9. While the current implementation depicted in FIG. 1 shows all three systems (issue tracking system 106, collaboration system 108, remote system 110) residing on the same host server(s) 104 or host service, in other implementations, any or all of the three systems may reside or be provided by a separate or discrete server.

In some implementations, the issue tracking system 106 is an application platform that is configured to receive from the client device 102 (e.g., via user input provided through a graphical user interface rendered on a display, provided by one or more integrated applications and/or microfunctions), without limitation: a request to open, create, or report an issue in a particular project; a request for issue status; a request to modify an existing issue; a request to close an existing issue; a request to link an existing issue to another issue; a request to assign an issue to a particular user; a database request related to content stored by the issue tracking system; and similar communications or commands. More generally and broadly, however configured or implemented, the issue tracking system 106 of the host server(s) 104 is configured to manage and maintain a record of issues reported in one or more software development projects.

Similarly, the collaboration system 108 is an application platform that can be configured to receive from the client device 102 (e.g., via user input provided through a graphical user interface rendered on a display, provided by one or more integrated applications and/or microfunctions), without limitation: a request for a page; a request for a document; a request for user-generated content; a selection of one or more links or linked content associated with a page; a request for comments; a request to view a parent or child page; a search query; a database request related to content stored by the collaboration system, or other similar communications or commands. More generally and broadly, however configured or implemented, the collaboration system 108 of the host server(s) 104 is configured to manage and maintain various pages and associated content for a multi-user distributed content collaboration system.

The remote system 110 may include one or more product platforms that are configured to receive various communications and/or commands from the client device 102 (e.g., via user input provided through a graphical user interface rendered on a display, provided by one or more integrated applications and/or microfunctions). The remote system 110 may be broadly directed to one or more of a series of application platforms or systems, including, without limitation, a retail marketplace platform, a social media platform, a messaging platform, a financial platform, a content or news platform, a media platform, a game platform, a collaboration platform, a security service, a money exchange service, a remote storage service, or other type of platform or service. The communications and/or commands may include, without limitation: a request for content; a search query; a request for a webpage; a request for a document or other media; commands or operations related to a financial transaction; a request to view products; a request to purchase a product or service; operations related to an authentication of a user and/or a payment account; a submission of a document or other media; a submission of personal information or other data; and other similar commands or operations.

The client device 102 leveraged by the quality control engineer can be any suitable personal or commercial electronic device and may include, without limitation or express requirement, a processor 120, volatile or non-volatile memory (identified, collectively, as the memory 122), and a display 124. Example electronic devices include, but are not limited to: laptop computers; desktop computers; cellular phones (mobile phones); tablet computing devices; portable media players; and so on. An example of device or hardware resources that may be included in the client device are described below with respect to the device 900 of FIG. 9. It may be appreciated that a client device 102, such as described herein, can be implemented in any suitable manner.

In many embodiments, the processor 120 of the client device 102 can be configured to execute an application (herein referred to as a "integrated application" or a "client application") stored, at least in part, in the memory 122. More specifically, the processor 120 of the client device 102 can be configured to access at least one executable asset (e.g., binary code, compiled program code, or other executable instructions) from a nonvolatile portion of the memory 122 and to load that executable asset into a working portion (e.g., volatile) of the memory 122. By doing so, the processor 120 can cause to be instantiated the client application or at least a portion thereof.

The integrated application can be used by a user to access and communicate with the host server(s) 104 and to securely transact information or data with, and provide input(s) to, the host server(s) 104. In some embodiments, the integrated application may include a browser application configured to access a web page or service hosted by the host server(s) 104 that is accessible to the client device 102 over a private or public network 130 that may, in some embodiments, include the open internet, a local area network, a wide-area network or other networked computing system.

Figure 2A:
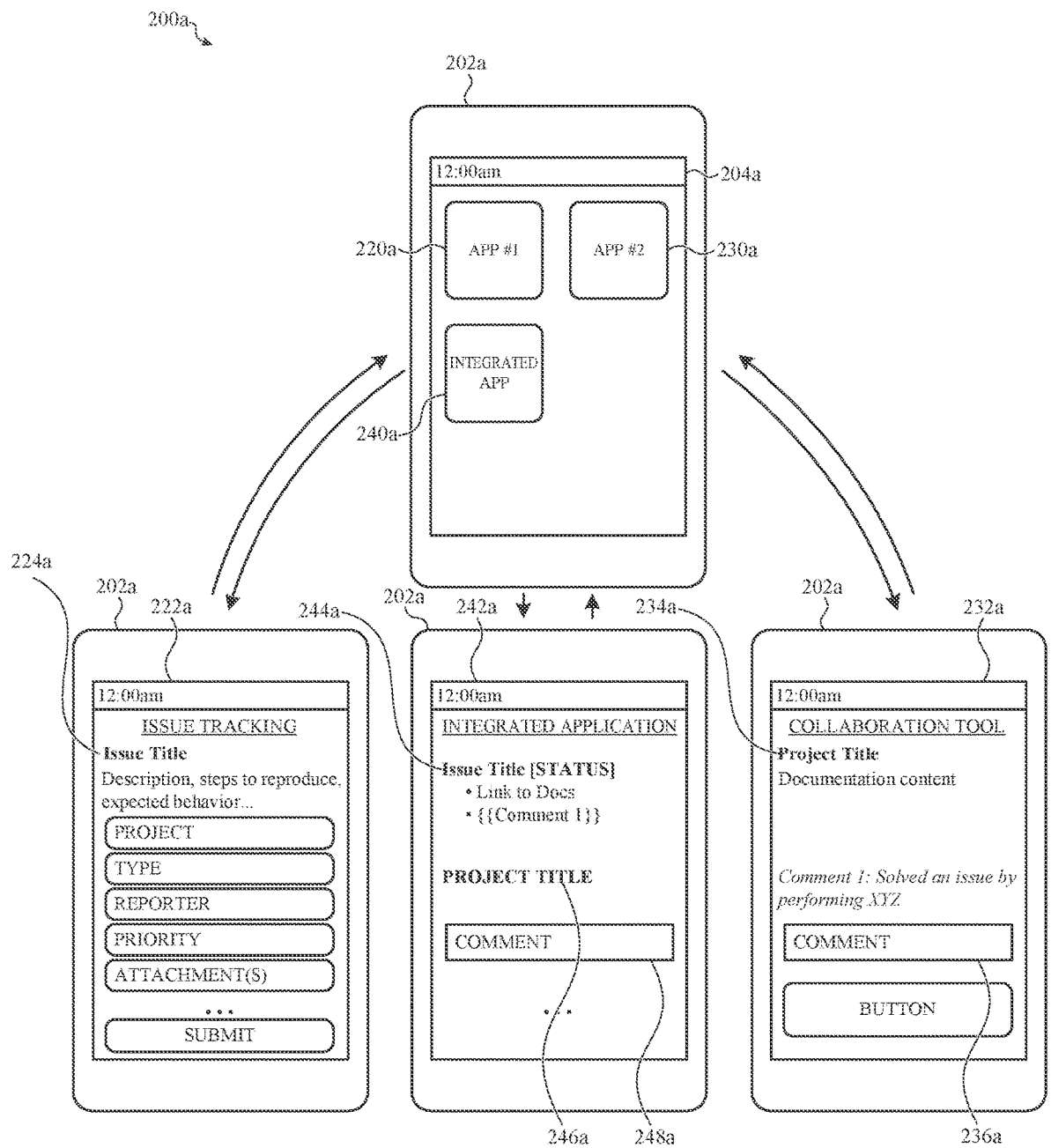
FIG. 2A depicts a user device (a "client device") executing an integrated application defining a single user interface facilitating access to one or more selected microservices or microfeatures provided in a local service-oriented architecture.

FIG. 2A depicts a user device executing an integrated application having multiple microfunctions provided by multiple distinct application platforms. As discussed above, an integrated application may be used to generate a user-defined application that includes functionality and specific modules (e.g., one or more microfunctions) that provide an efficient use of computer resources. The integrated application may also present operational efficiencies by flattening out menu structures or collapsing the operational hierarchy of various functions in order to present a customized interface that includes features and elements that may be most useful to the user.

FIG. 2A depicts an environment 200a of applications and microfunctions that can be executed or instantiated on a user device 202a. As shown in FIG. 2A, the user device 202a can be configured to operate one or more various software applications, also referred to herein as mobile applications or client applications 220a, 230a, and 240a. In the example of FIG. 2A, the mobile applications 220a and 230a are full-version mobile applications that may be associated with respective software platforms. In particular, the mobile client 220a (also referred to as issue tracking client 220a) is adapted to interface with an issue tracking system or platform, and can be used to manage and track software development tasks and issues, as described above with respect to issue tracking system 106 of FIG. 1.

The other example mobile client 230a (also referred to herein as collaboration client 230a) is adapted to interface with a collaboration system or platform and can be used to manage content and communications between a group of users or members, as described above with respect to collaboration system 108 of FIG. 1.

The third mobile application 240a is an integrated application or client that includes one or more microfunctions, as defined by the user. As described herein, the mobile application 240a (also referred to herein as the integrated application 240a or integrated client 240a) may include an interface 242a that includes user interface elements that relate to functionality or user interface elements in one or more full-version or service-specific client applications. In this example the integrated application 240a includes microfunctions that are associated with two different platforms, namely a full-version issue tracking platform and a full-version collaboration platform.

As described previously, the integrated application 240a may include one or more microfunctions that have been selected by a user. Each microfunction, in this example, is associated with functionality provided by a full-version or service-specific application or client, but this is not required. As demonstrated in other examples described herein, a microfunction may perform functionality that is adapted to be shared across multiple applications (e.g., a payment module, a shopping cart module, a database function) and may not be associated with a specific full-version mobile application or client. The user selection of the various microfunctions to be included in the integrated application 240a are described in more detail below with respect to FIG. 2B.

As shown in FIG. 2A, the integrated application 230a, when executed or instantiated on the client device 202a, defines a graphical user interface having multiple regions that are each associated with a particular microfunction. In the example of FIG. 2A, the integrated application 230a generates graphical user interface 242a, which includes regions 244a, 246a, and 248a. The graphical user interface 242a may include other regions, graphical elements, or other content in addition to the regions 244a, 246a, and 248a, which is omitted from this particular example for clarity.

The graphical user interface 242a of the integrated application 230a may be configured to receive input for each of the respective regions 246a, 248a, which may enable the respective microfunction to initiate communications with a respective remote service. For example, in response to user input to either region 246a, 248a, the respective microfunction may provide a function or a service, which may be an analysis of the user input, determining a result based on the user input, changing a status or graphical output of the respective region 246a, 248a in response to the user input, displaying a stored value or result based on the user input, or other similar operation. The respective microfunction may also submit a request to a remote host device or service in response to the user input or other interaction with the respective region 246a, 248a or the integrated application 230a. The specific request depends on the type of microservice and the respective remote host device or service. As described above, with respect to FIG. 1, an example request may include a request for an issue title, issue status, issue status change, owner or author, project, epic, or other issue related data, a database request, a document request, a messaging request, or other similar communication. An example request may also include a request for a content associated with a page or project including, for example, page title, project title, authors or contributors, project description, or other project or page-related data. The request may also include a database request, a request for a document, a request or query for a project library, a request for a set of project comments, or other similar communications. The result of the request may also be displayed in the respective region 246a, 248a along with the data or result determined or produced by the respective microfunction.

In this particular example, each region is associated with a microfunction, which is derived from or related to corresponding functionality from one of the service-specific clients or full-version applications. Specifically, the graphical user interface 242a includes a first region 244a, which corresponds to user interface elements or region 224a produced by graphical user interface 222a of the issue tracking client 220a. In this example, the first region 244a is produced by a first microfunction, which provides functionality related to an issue overview similar to a subset of the functionality provided by the issue tracking client 220a. As described herein, the microfunction associated with the first region 244a may be adapted to communicate with the issue tracking platform or system (e.g., issue tracking system 106 of FIG. 1) in a similar manner as the full-version issue tracking client 224a. Specifically, the microfunction associated with the first region 244a may be adapted to retrieve content from the issue tracking platform including issue titles, issue status, links to issue documents, comments associated with the issue, and other data related to one or more issues or items being tracked by the respective issue tracking platform. These types of operations may be generally referred to as collectively, database functions or database-directed microfunctions. The data obtained from a respective host platform or server may be presented in conjunction with data determined or produced by the respective microfunction. For example, the microfunction may be configured to produce a set of fields, graphical objects, or other output that is responsive to user input as well as display data obtained from a respective host platform or server.

The graphical user interface 224a also includes second region 246a and a third region 248a, which may correspond to functionality provided by the collaboration client 230a. Specifically, the second region 246a, which may be provided by a second microfunction, may provide functionality that corresponds to the region 234a of the collaboration client 230a. This functionality may include operations associated with a project overview and may include the ability to retrieve a current project title, project authors, content owners, and other information associated with a page or project managed by a collaboration platform. Similarly, the third region 248a may be provided by a third microfunction and may provide functionality that corresponds to the region 236a of the collaboration client 230a. This functionality may include operations associated with a comment field of a page or project managed by the respective collaboration platform, which may be configured to obtain and display a set of comments associated with a project or a page of the collaboration platform.

The examples provided above are merely illustrative examples and there may be additional microfunctions that are associated with other aspects of the interface 222a provided by the issue tracking client 220a and the interface 232a of the collaboration client 230a. Additionally or alternatively, the integrated application 240a may include microfunctions that are not necessarily associated with functionality provided by an existing full-version client. Further, the integrated application 240a may include one or more microfunctions that are associated with functionality that is not necessarily associated with a particular system or platform. Examples of such microfunctions are described herein with respect to FIG. 2C, below.

In the present example, the client application 220a is associated with a full-version issue tracking client 220a as it relates to an issue tracking system or platform. An "issue tracking system" or "issue tracking platform," as described herein, may be used to refer to a project management system or tool that can be implemented in whole or in part as software executed by a virtual, containerized, or physical server or other computing appliance or combination of appliances that provides a team of individuals with a means for communicating and exchanging information with one another.

In many examples, an issue tracking system is configured for use by a software development team to exchange information that can facilitate the completion and assignment of discrete tasks related to software development projects from creation of new user stories (e.g., user-perspective feature requests or desired functionality), through proof of concept testing, through integration testing, through release of software to one or more users, and through reporting and fixing of software errors or inefficiencies ("bugs").

In many examples, an issue tracking system, however configured or used by a team of individuals or an organization, is implemented with a client-server architecture in which a host server or service of the issue tracking system exchanges requests and responses (which may comply with a communication protocol such as HTTP, TCP, UDP, and the like), with one or more client devices, each of which may be operated by a user of the issue tracking system. In other cases, event-driven architectures may be used. In this manner, a host server of an issue tracking system can serve information to each client device, and in response, each client device can render a graphical user interface on a display to present that information to the user of that respective client device.

In the present example, the client application 230a is associated with a full-version collaboration client 220a as it relates to a collaboration system or platform. A "content collaboration system" or "collaboration platform," as described herein, may be used to refer to a system that is configured to provide an interface for user- and/or group-defined workspaces that can be used as a resource for various teams and entities in an enterprise. A content collaboration system may include a collection of dynamic pages that organize and present content related to a team or project within an organization otherwise referred to as a user group. Content collaboration systems, as described herein, may include user-created content, links, or portals to related resources or sites, and message boards, comment fields, document collections or libraries, or other collaboration tools used to distribute information to the user group or collect feedback and other user input.

Other types of applications, systems, and platforms are described herein and the techniques for providing microfunctions are not limited to the content collaboration system and issue tracking system examples provided in this particular example.

As shown in FIG. 2A, the various applications 220a, 230a, 240a may be launched, purchased, or acquired from a mobile operating system environment or interface 204a. In one example the client applications 220a, 230a, 240a may be loaded into working memory of the client device 202a and instantiated in order to communicably couple to the respective host services or platforms, in accordance with the examples provided herein. The interface 204a may correspond to a home screen of a mobile operating environment or operating system, which allows the user to launch one or more of the client applications 220a, 230a, 240a in addition to other applications, which are not specifically depicted in the example interface 204a. The interface 204a may also correspond to a mobile device marketplace or application store that offers purchase, download, and/or execution of various applications, including the client applications 220a, 230a, 240a. In some operating environments, the client applications 220a, 230a, 240a are qualified applications that have been approved for use on a particular operating platform or class of devices and distributed by a publisher or other software vendor, which may or may not be associated with the operator of the respective platforms or systems.

Figure 2B:
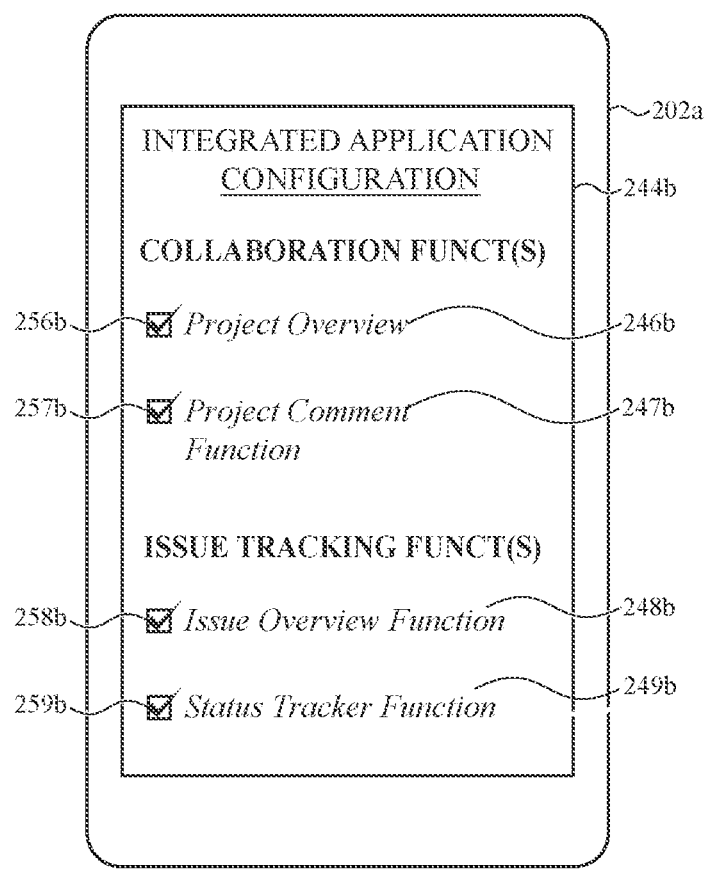
FIG. 2B depicts an example interface for selecting one or more microservices or microfeatures to be included in the integrated application.

As described previously, the user may configure or adapt a particular integrated application to suit the user's specific needs. FIG. 2B depicts a system 200b with an example user device 202a operating an interface 244b that can be used to configure an integrated application by selecting one or more microfunctions. The interface 244b may be associated with a configurator provided by an application store, application marketplace, or other online software delivery environment. In some instances, the interface 244b is provided by the operator of a respective platform or suite of platforms or services and may allow the user to select from a curated list of modules or functions associated with the operator's suite of platforms or services.

In the current example, the interface 244b allows the user to select one or more selectable options 246b, 247b, 248b, 249b associated with a respective microfunction. As shown in FIG. 2B, each selectable option 246b, 247b, 248b, 249b may include an affordance or selectable graphical object (selection boxes 256b, 257b, 258b, 259b), which can be selected by the user to designate the respective microfunction for integration into the integrated application. As shown in FIG. 2B, the selectable options 246b may correspond with one or more of the microfunctions that are used to present the interface 242a of the integrated application 240a of FIG. 2A. While each microfunction has a corresponding selection box 248 in this example, in other implementations, one or more microfunctions may be associated with a group of functions or operational interfaces, which are packaged together as part of a common or shared microfunction.

Once selected by a user, the respective microfunctions may be associated with the integrated application by a configuration file or other form of local computer storage. In response to a request to instantiate or execute the integrated application, the configuration file may be used to identify a set of respective microfunctions, which may be instantiated or executed in concert with the integrated application. As described herein, a single instantiated microfunction may be shared by multiple integrated applications, which may allow for shared resource allocations including hardware resources. The configuration file and other local computer storage may be used to identify which microfunctions are currently instantiated and link two or more integrated applications to the instantiated microfunction, without instantiating duplicate versions or instances of the same microfunction.

Figure 2C:
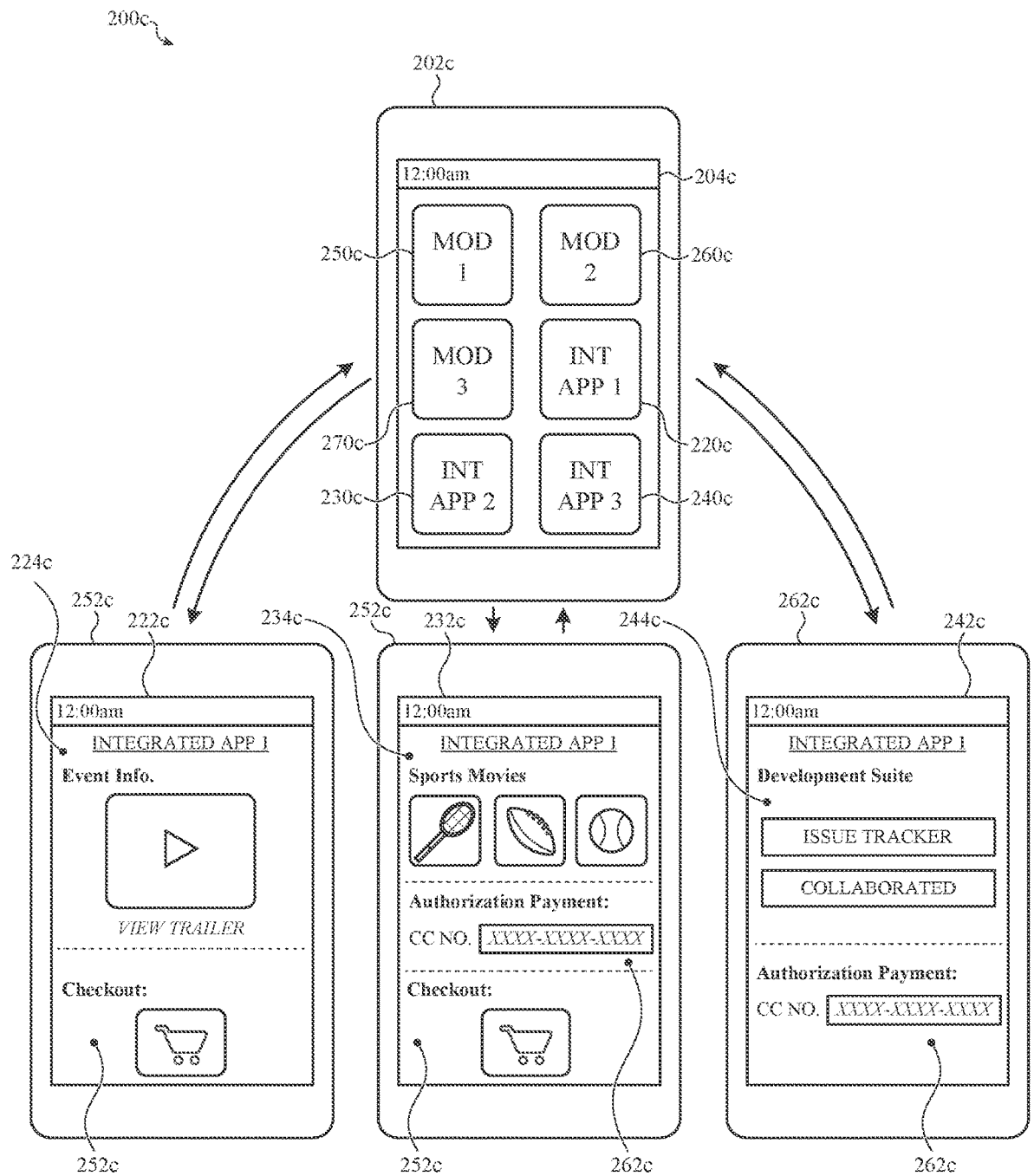
FIG. 2C depicts a user device executing an integrated application having micro-application services that are shared across various service-specific applications.

FIG. 2C depicts a system 200c in which a user device executes various example integrated applications having micro-application services that are shared across various service-specific applications. As described previously, microfunctions may be shared across multiple integrated applications or platforms in order to create a more efficient computing environment. In particular, by leveraging a single microfunction across multiple integrated applications, redundant executables and instantiated programs may be reduced, which helps to conserve limited memory resources on a portable user device like a mobile phone or tablet. Additionally, each microfunction may be specially adapted for a particular set of operations, the design, testing, and validation of which can be leveraged across multiple applications. As described herein, a particular microfunction may incorporate particular security features or privacy protections that may be uniformly adopted across multiple integrated applications, thereby improving the overall security performance and privacy standards across a suite of applications.

As shown in FIG. 2C, microfunctions may be implemented as part of an integrated application or, alternatively, be accessed individually from an application selection interface 204c of the user device 202c. Similar to the previous example, the application interface 204c may correspond to a home screen of a mobile operating system. The various microfunctions 250c, 260c, 270c and/or various integrated applications 220c, 230c, 240c may be launched, purchased, or acquired from a mobile operating system environment or interface 204c. In one example the various microfunctions 250c, 260c, 270c and/or various integrated applications 220c, 230c, 240c may be loaded into working memory of the client device 202a and instantiated in order to communicably couple to the respective host services or platforms, in accordance with the examples provided herein. The interface 204c may correspond to a home screen of a mobile operating environment or operating system, which allows the user to launch one or more of the integrated applications 220c, 230c, 240c in addition to other applications, which are not specifically depicted in the example interface 204a. The interface 204a may also correspond to a mobile device marketplace or application store that offers purchase, download, and/or execution of various applications, including the microfunctions 250c, 260c, 270c and/or integrated applications 220c, 230c, 240c. In some operating environments, the microfunctions 250c, 260c, 270c and/or integrated applications 220c, 230c, 240c are qualified applications that have been approved for use on a particular operating platform or class of devices and distributed by a publisher or other software vendor, which may or may not be associated with the operator of the respective platforms or systems.

In the example of FIG. 2C, there are three example graphical user interfaces 222c, 232c, 242c, each associated with a corresponding integrated application 220c, 230c, 240c. As shown in the examples of FIG. 2C, each of the user interfaces 222c, 232c, 242c include one or more regions that correspond to a microfunction, which may be instantiated and operating in tandem with the integrated application. As shown in the examples below, the various microfunctions may be shared across different integrated applications and may be used to provide common functionality that is useful across a suite of applications. The common functionality may include features or operations that are useful in a variety of contexts and may include, for example electronic payment authorization and financial transactions, user authentication, shopping cart functionality, database functions, messaging or chat functions, analytics frameworks, navigational operations, camera operations, audio/visual recording and/or playback, messaging or other communication services, and a variety of other services.

FIG. 2C depicts three example user interfaces to illustrate the general principle of how microfunctions may be shared across different integrated applications. Specifically, integrated application 220c may be instantiated or executed to produce the graphical user interface 222c, which includes both application-specific regions and microfunction-generated regions in the same screen or interface view. In this example, the graphical user interface 222c includes an event or activity promotional interface that includes an application-specific region 224c that includes information regarding an upcoming event, multimedia content, and selectable elements. The application-specific region 224c may be generated by software or executable code that is instantiated by the corresponding integrated application 220c. The graphical user interface also includes a region 252c that is generated by a first microfunction 250c.

In this example, the region 252c corresponding to the microfunction 250c is directed to a shopping cart function or set of operations. Specifically, the region 252c may include a set of graphical objects and/or selectable affordances that allow a user to add and remove items in a shopping cart, which may be purchased or otherwise designated for the user. The shopping cart operations may include graphical elements or fields for receiving user information including, for example, full name, address, phone number, credit card or other payment information, shipping preferences, and other similar information. The microfunction 250c may also be used to generate an interface for saving items to a wish list, generating a purchase registry or request for other persons to purchase listed items, generating a shopping list, entering items into an auction or online bidding market, and other similar operations.

One unique aspect of the shopping cart provided by microfunction 250c is that the items stored or identified by the shopping cart may include items that were selected from multiple different or distinct software applications and/or platforms. For example, the shopping cart interface 252c may include a list of user-selected items that includes items for purchase (e.g., event tickets) selected via integrated application interface 222c and products offered for sale (e.g., sports equipment) selected via integrated application interface 232c and software products or services (e.g., issue tracking modules or collaboration modules) selected via integrated application interface 242c. In this way, a microfunction may be used to aggregate user selections or interactions with multiple different applications, which may further reduce computer resources and improve the overall efficiency of the device or system 202c or corresponding systems.

FIG. 2C also depicts two other example graphical user interfaces 232c, 234c that are generated by two corresponding integrated applications 230c, 240c. Both graphical user interfaces include application-specific regions and regions generated by one or more microfunctions. In particular, the graphical user interface 232c includes a sporting equipment marketplace that includes an application-specific region 234c that includes information regarding various (sports related) products for sale or rent. In this specific example, the application-specific region 234c includes selectable icons that may allow the user to browse a corresponding set of products or items that is associated with the selected category (e.g., type of sport). The application-specific region 234c may also include item descriptions, prices, availability, estimated delivery, links to related content or media, and other similar content. The application-specific region 234c may be generated by software or executable code that is instantiated by the corresponding integrated application 230c. The graphical user interface 232c also includes a region 252c that is generated by the first microfunction 250c. The region 252c is generated by the same microfunction 250c as the corresponding region 252c of the graphical user interface 222c. In particular, a single instance of the microfunction 250c may be instantiated or otherwise operate both corresponding regions 252c in each respective graphical user interface 222c, 232c.

The (third) graphical user interface 242c includes an interface related to a product or software development suite of services that includes an application-specific region 244c. The application-specific region 244c in this example includes information regarding various software applications, modules, or services related to product development productivity tools. The software applications or modules may relate to issue tracking systems or collaboration systems similar to those described elsewhere in this disclosure. In some cases, application-specific region 244c includes modules that correspond to one or more microfunctions related to those types of platforms or systems, similar to as described above with respect to FIGS. 2A and 2B. The application-specific region 244c may be generated by software or executable code that is instantiated by the corresponding integrated application 240c. The graphical user interface 242c also includes a region 262c that is generated by a second microfunction 260c. The region 262c is generated by the same microfunction 260c as the corresponding region 262c of the graphical user interface 232c. In particular, a single instance of the microfunction 260c may be instantiated or otherwise operating both corresponding regions 262c in each respective graphical user interface 232c, 242c.

As shown in FIG. 2C, the microfunction 260c may be used to generate a region 262c of a graphical user interface that is used to facilitate or conduct a financial transaction. In particular, the microfunction 260c may be used to generate a variety of fields or user-interface elements that are configured to receive information including, but not limited to, a cardholder's name, billing address, credit card or payment card number, card verification code (CVC) number, expiration date, zip code, payment recipient, payment memo or notes, and other related information. The microfunction 260c may also be configured to conduct a secure financial transaction that may be conducted either directly with a recipient or through an intermediary or clearinghouse (e.g., Automated Clearing House (ACH), Clearing House Interbank Payments System (CHIPS)). In some cases, the microfunction 260c is configured to communicate payment information through an encrypted channel and/or using a token exchange to ensure privacy and security of the transaction or exchange. By way of example, the microfunction 260c may establish a payment gateway with an electronic payment processor or system. The processor may receive payment data and other information from the microfunction 260c running on the client device 202c and relay information to a card network or issuer for account verification and approval. In response to the payment communication initiated by the microfunction 260c, the issuer may authorize a respective bank or financial institution to transfer funds or credit to the appropriate recipient. This is provided by way of illustrative example and there may be other financial transactions or operations that may be performed using the microfunction 260c.

In some implementations, a microfunction (similar to microfunction 260c) may provide a user authentication function in order to provide user authentication or login operations for multiple integrated applications. For example, the microfunction may include fields for requesting a multi-factor authentication sequence, which may include the user providing an access code, bio-authentication, or other input that is used to verify and authenticate the user. Bio-authentication may include collecting a fingerprint, performing a facial scan, or obtaining an electronic representation of some other distinguishing characteristic of the user. The microfunction may facilitate the multi-factor authentication sequence and maintain the freshness of the authentication as the client device 202c is cycled through various sleep or power modes or the device 202c is operated over extended periods of time. The microfunction may also serve as a repository of authorized users and may use bio-authentication or other techniques to identify the user (in addition to or instead of providing an authentication). The user identification and/or authentication may be used to unlock or access functionality within the integrated application or tailor the functionality provided by the integrated application to the particular user. The same user authentication process or procedure performed by a single microfunction may also be used or accessed by multiple applications or services, thereby allowing a single user login to enable access to multiple platforms, applications, and other services.

The various microfunctions described herein may be implemented by a variety of techniques. As described previously, the software associated with a microfunction may be instantiated in tandem with other code that provides the application-specific functionality of the integrated application. In some cases, the integrated application may serve as a platform for operating multiple microfunctions and the main functionality of the integrated application may be provided by the individual microfunctions (rather than by application-specific functionality of the integrated application).

In some instances, the microfunction may be instantiated or otherwise implemented as an extension or plug-in to the integrated application. The plug-in can take the form of a shared executable, inter-application communication, a shared executable instruction set, or any suitable combination thereof. For example, the microfunction may be instantiated separately from the integrated application and may be dynamically instantiated during run time (and/or on demand) of the integrated application. In some cases, the microfunction may run in a container environment provided by the integrated application or may run native to the device's operating system or operating environment. The extension or plug-in may drive the operation of a region of a graphical user interface to provide the functionality described herein. As noted previously, an extension or plug-in may be shared across multiple different integrated applications, which may ensure consistency and reduce overall usage of device resources.

In some instances, the microfunction may be implemented using an application programing interface (API) scheme that facilitates communication between the microfunction and the integrated application. The API can be locally hosted or served, or may be served in combination with calls or responses from remote servers or services. An example API may be provided via inter-application communication protocols defined by an operating system underpinning both the microfunction and the integrated application.

For example, the microfunction may provide a library of local API calls that may be accessed by the integrated application and used to drive the region or regions of the graphical user interface. The microfunction API may operate using RESTful architecture, but this is merely one example. Other example architectures include, but are not limited to: subscription models; announce models; hook/callback models; and so on. Similar to the other examples provided herein, a single instance of a microfunction may service or be utilized by multiple different integrated applications.

In yet other example constructions, a microfunction can provide a web server or web service configured to be rendered within a frame or other document object model region of a browser application (in this example, the integrated application may be a general purpose browser configured to render HTML, CSS, or other internet standard languages, annotations, and so on). In these examples, one or more microfunctions can operate as local webservers that, in turn, can serve information in response to standard TCP, HTTP, and/or UDP requests that may originate from an integrated application as described herein. In these examples, the integrated application can include one or more dedicated page locations through which web content served by the microfunction can be rendered.

In yet further examples, a microfunction as described herein can be containerized, such as noted above. In these examples, a single containerized microfunction or microservice can be accessed by multiple discrete applications executing on a mobile device or client device as described herein. For example, a shopping cart microservice can be leveraged by multiple different ecommerce applications, thereby enabling a user of the microservice to maintain current payment information in only a single location. In another example, an analytics microservice can be leveraged by multiple different applications, thereby eliminating the need for each individual application to bundle (and/or otherwise design, develop and maintain) a dedicated analytics engine. In yet another example, a multimedia selection microservice can provide access to device-level multimedia, thereby establishing a single gateway through which multimedia of a given user can be accessed.

Figure 3:
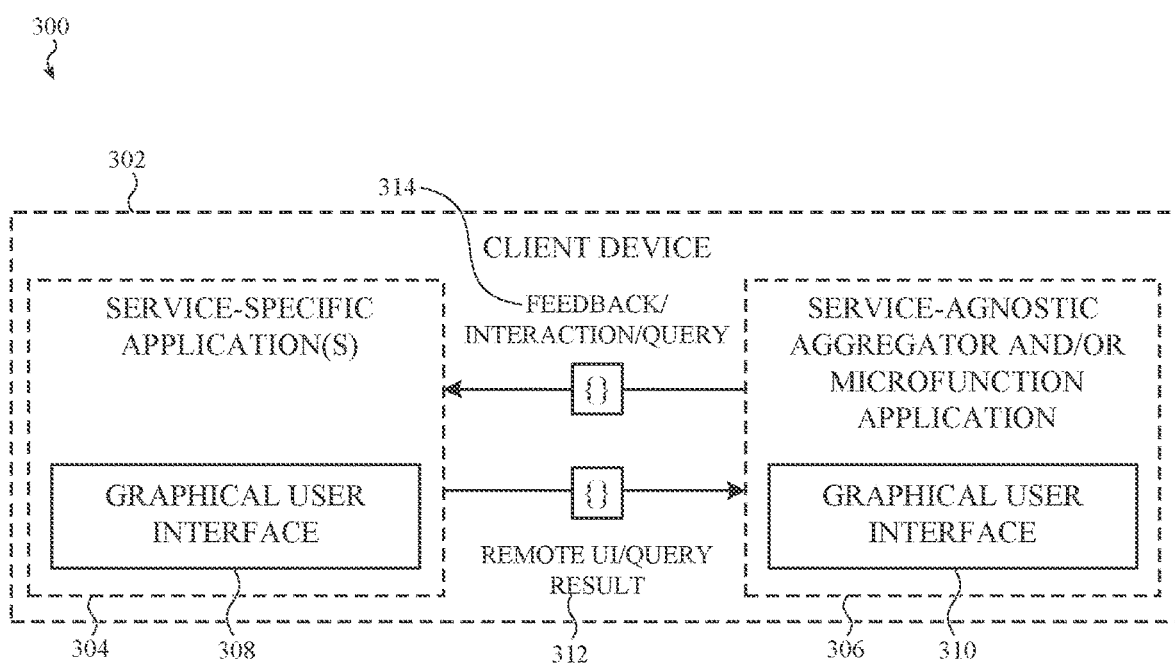
FIG. 3 depicts a flow diagram of communications between a service aggregator and/or a micro-application service application and a service-specific application.

FIG. 3 depicts a flow diagram 300 of communications between a service aggregator or microfunction and a service-specific or integrated application. As with other embodiments described herein, the client device 302 can be any suitable electronic device and can be configured as described above with reference to FIGS. 1 and 2A-2C. Similarly, it may be appreciated that the client device 302 can be communicably coupled to one or more host servers or platforms, such as described above; for simplicity of description and illustration, these elements are omitted from FIG. 3.

As with other client devices described herein, the client device 302 can be configured to execute one or more instances of one or more applications. In particular, the client device can include a processor, a working memory, a persistent memory, and/or one or more displays or networking connections. In these examples, the processor of the client device 302 can be configured to retrieve one or more instructions stored in the persistent memory and can execute those instructions to instantiate one or more software applications by leveraging the working memory for temporary storage. Such applications, which as described in reference to other embodiments referenced and described herein, can include a service-specific application, an integrated application, a microfunction, or other type of application or module. It may be appreciated that the foregoing described information/signal flow description of processes of instantiating or otherwise launching an application, such as described herein, are not exhaustive of the various methods that may be leveraged by or performed by a processor of a client device, such as the client device 302. In other embodiments, software applications may be launched in any other suitable manner.

In the illustrated embodiment, the client device 302 has instantiated two separate software elements, a service-specific application 304 (also referred to herein as an integrated application) and a microfunction 306 (service-agnostic aggregator and/or microfunction application). The microfunction 306 is depicted as generating a graphical user interface 310 that may be distinct from the graphical user interface 308 of the service-specific function. However, as described herein, the microfunction 306 is typically used to drive a region or aspect of the graphical user interface 308 of the service-specific function. As with other embodiments described herein, multiple microfunctions can be instantiated by the client device 302 and can be communicably coupled to the service-specific or integrated application 304; FIG. 3 depicts only a single microfunction for simplicity of illustration.

In accordance with other embodiments described herein, the service-specific or integrated application may provide the main graphical user interface 308, 310, which is displayed on the user device 302. The microfunction 306 may not generate a separate graphical user interface, but may render, generate, or otherwise direct one or more regions within the main graphical user interface 308, 310. Example graphical user interfaces are described above with respect to FIGS. 2A and 2C.

As with other embodiments described herein, the service-specific or integrated application 304 and the microfunction 306 can be configured to exchange information, such as described herein, in a number of suitable ways. In particular, the service-specific or integrated application 304 can be configured to pass by reference or by value a remote user interface query or result 312 to the microfunction 306. The remote user interface query or result 312 may be used by the microfunction 306 to receive signals that correspond to various user inputs and other interactions with the graphical user interface 308, 310.

The query or result 312 communication may also be generated by the service-specific or integrated application 304 in response to an event or change of state of the service-specific or integrated application 304. In response, the microfunction 306 may pass by reference or by value a feedback interaction or query 314 to the service-specific or integrated application 304. The feedback interaction or query 314 may be interpreted by the service-specific or integrated application 304 in order to drive or render portions of the graphical user interface 308, 310, in accordance with the examples provided herein.

The microfunction 306 and the service-specific or integrated application 304 can exchange the query or result 312 and/or the feedback interaction or query 314 in a number of suitable ways. Examples include, but are not limited to: storing at a persistent memory address by the service-specific or integrated application 304 data that may be retrieved at any suitable time (e.g., on demand, in response to an event report or notification, according to a schedule, and so on) by the microfunction 306; storing at a working memory address by the service-specific or integrated application 304 data that may be retrieved at any suitable time (e.g., on demand, in response to an event report or notification, according to a schedule, and so on) by the microfunction 306; generating an event to push to a system event queue by the service-specific or integrated application 304 in a format suitable to be recognized and consumed by the microfunction 306; via an inter-app communications protocol; via an inter-app messaging service; and so on.

It may be appreciated that the foregoing examples are not exhaustive and that two instances of two different applications may suitably communicate in a number of different ways.

Independent of the method(s) by which the microfunction 306 and the service-specific or integrated application 304 exchange information or data via channels 312, 314 (or other data such as context data or context information), it is understood that the information can be used by either or both applications to inform one or more operations of those applications.

For example, as noted with respect to other embodiments described herein, the service-specific or integrated application 302 may be configured to render one or more graphical user interface elements in the graphical user interface 308, 310. These user interface elements may correspond to a region of the graphical user interface 308, 310 that is controlled by or rendered in response to the microfunction 306. Similarly, the service-specific or integrated application 306 may be configured to render one or more graphical user interface elements. These elements can receive user inputs from the user to instruct the microfunction 306 to perform one or more operations (e.g., initiate an electronic payment, add an item to a shopping card, make a query or function call to a database or provide another database function, collect analytics regarding data being displayed or received by the service-specific or integrated application 304).

Figure 4:
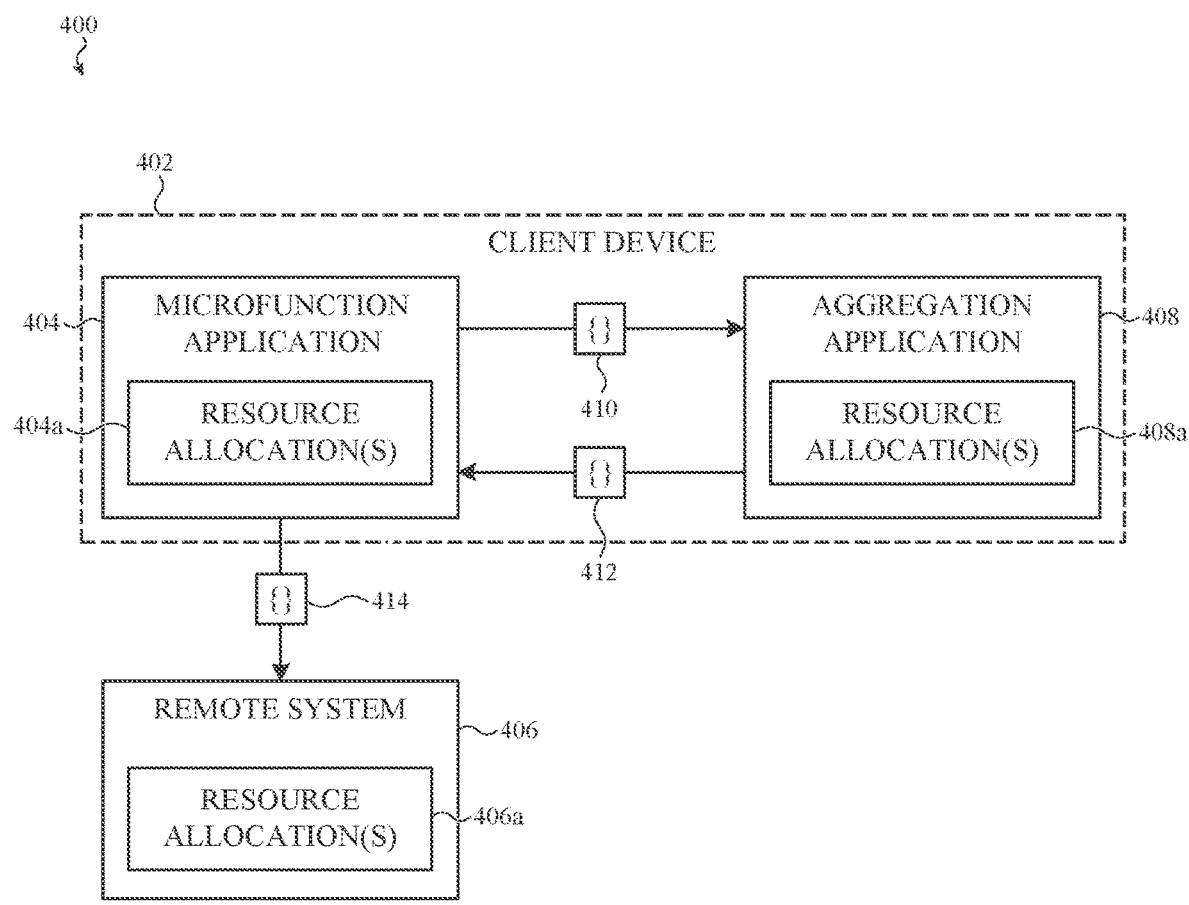
FIG. 4 depicts a flow diagram of communications between a local application and a remote service on a client device having an integrated application.

FIG. 4 depicts a flow diagram of communications between a local application and a remote service on a client device having an integrated application. In particular, in this example, the system 400 includes a client device 402 in communication with a remote system 406 that leverages physical and/or virtual resources (identified as the resource allocations 406a) of a host device such as described herein. The remote system 406 may correspond to one or more of the systems described above with respect to the host server(s) 104 of FIG. 1. Specifically, the remote system 406 may correspond to one or more of the issue tracking system 106, the collaboration system 108, or the remote system 110 of FIG. 1.

The client device 402 can instantiate both an integrated application 408 (leveraging physical and/or virtual resources of the client device, identified as the resource allocations 408a) and a microfunction 404 (leveraging physical and/or virtual resources of the client device, identified as the resource allocations 404a). The integrated application 408 can generate a query or command 410 and pass by reference or by value that query or command 410 to the microfunction 404 which, in response thereto, can perform one or more operations, which may include various interactions with the remote system 406. In response to the one or more operations, the microfunction 404 can send back to the integrated application 408 the results of the various operations in addition to data retrieved from the remote system 406.

In accordance with the examples provided herein, the remote system 406 may include an issue tracking system, a collaboration system, or some other platform or remote system. In one example, the microfunction 404 may generate a communication 414 including a query or request to the remote system 406 using an API or other schema that is transmitted over a computerized network, which may include the Internet. The communication 414 may be provided in accordance with an HTTP communication protocol or other web-based communication scheme.

If the microfunction 404 is directed to an element or module of an issue tracking system, the query or request of communication 414 may include a request for an issue title, issue status, issue status change, owner or author, project, epic, or other issue related data, a database request, a document request, a messaging request, or other similar communication. The communication 414 may also poll the remote system 406 for a list of changes or modifications to issue data over a specified or implied time period. In response, the remote system 406 may provide issue or project data that is maintained by the remote system 406. In some instances, the remote system 406 may provide regular data push or transmission events that are received by the microfunction 404 and used to update the appropriate regions of the graphical user interface provided by the integrated application 408.

If the microfunction 404 is directed to an element or module of a collaboration system, the query or request of communication 414 may include a request for a content associated with a page or project including, for example, page title, project title, authors or contributors, project description, or other project or page-related data. The request may also include a database request, a request for a document, a request or query for a project library, a request for a set of project comments, or other similar communications. The communication 414 may also include a request for multi-media content or links that are referenced by or stored on the remote system 406. The communication 414 may also poll the remote system 406 for a list of changes or modifications to page or project data over a specified or implied time period. In response, the remote system 406 may provide page or project data that is maintained by the remote system 406. In some instances, the remote system 406 may provide regular data push or transmission events that are received by the microfunction 404 and used to update the appropriate regions of the graphical user interface provided by the integrated application 408.

In some implementations, the microfunction 404 may serve as a firewall or other information intermediary/gateway between the integrated application 408 and one or more remote systems 406. For example, the microfunction 404 may serve as the sole link between the integrated application 408 and the services provided by the remote system 406. For example, the microfunction 404 may serve as a proxy or virtual private network service. In other cases, the microfunction 404 may serve as a content filter (e.g., parental filter). As may be appreciated, this architecture allows the microfunction 404 to be the primary means of maintaining a secure data transfer between the client device 402 and the remote system 406. The microfunction 404 may establish a secure WebSocket, HTTPS, secure APIs, shells, tunnels, or other type of secure connection between the client device 402 and the remote system 406. In some cases, the microfunction 404 may establish an encrypted connection with the remote system 406 using hashing, symmetric cryptography, asymmetric cryptography, or other type of encrypted connection.

Figure 5:
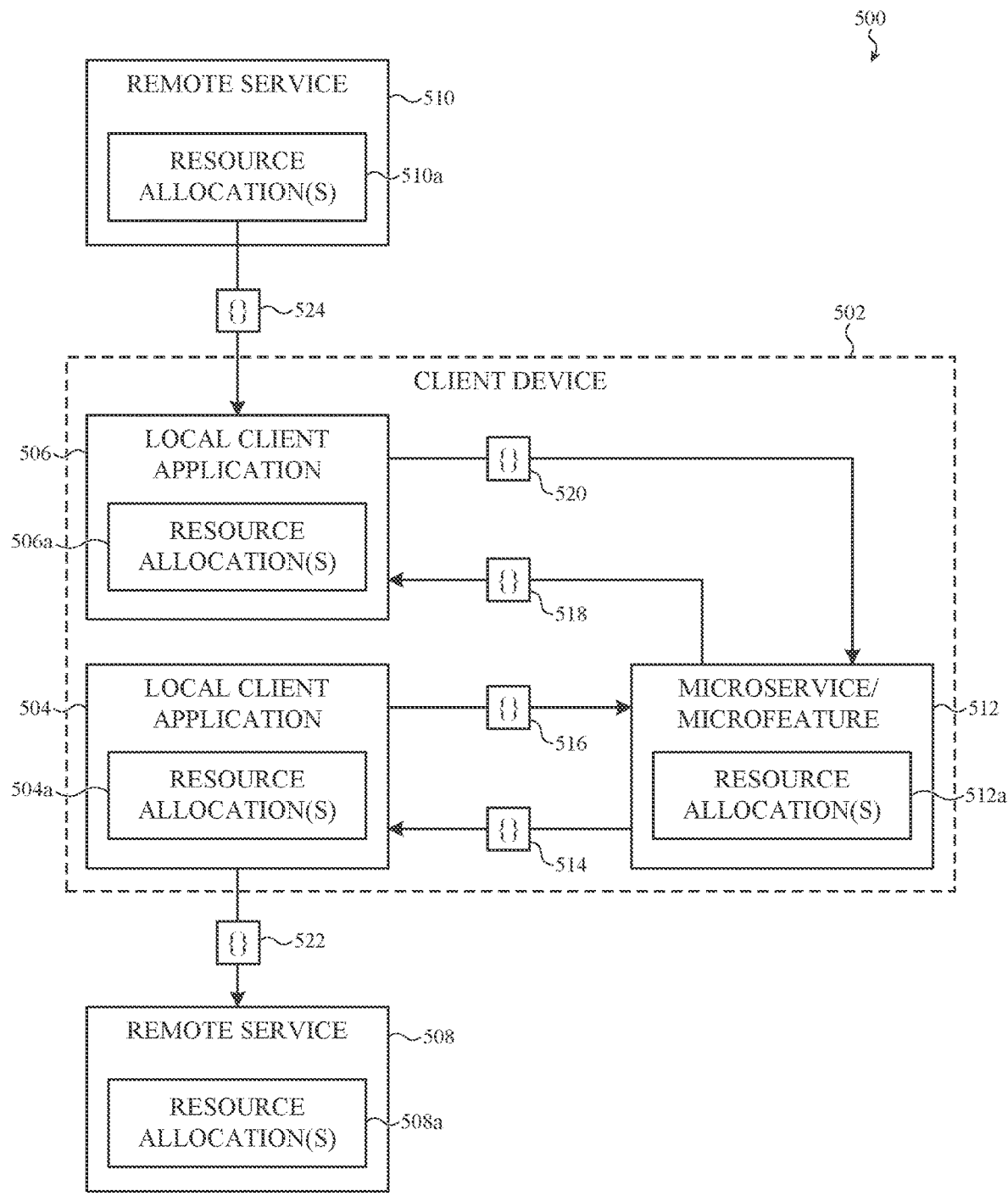
FIG. 5 depicts a client device having multiple applications that share a common pool of microfunctions.

FIG. 5 depicts a client device having multiple applications that share a common pool of microfunctions. The schematic diagram depicted in FIG. 5 may be used to implement the example integrated applications depicted in FIG. 2C. Specifically, FIG. 5 depicts a system 500 in which multiple integrated applications or local client applications 506, 508 can leverage a common or shared microfunction 512. In accordance with some embodiments, the microfunction 512 may be used to render, generate, or otherwise direct a respective region of a graphical user interface provided by the local client applications 506, 508.

As shown in FIG. 5, a system 500 may include a client device 502, in accordance with other examples described herein. The client device 502 can instantiate multiple integrated or local client applications 504, 506 (leveraging physical and/or virtual resources of the client device, identified as the resource allocations 504a, 506a) and a microfunction 512 (leveraging physical and/or virtual resources of the client device, identified as the resource allocations 512a). The integrated applications 504, 506 can generate communications 514, 516, 518, 520 and pass, by reference or by value, various queries or commands to the microfunction 512 which, in response thereto, can perform one or more operations. In response to the one or more operations, the microfunction 512 can send back to the integrated applications 504, 506 the results of the various operations or other microfunction output.

Also, as shown in FIG. 5, each local client application 504, 506 is adapted to communicate with a respective remote service 508, 510 (leveraging physical and/or virtual resources of the client device, identified as the resource allocations 508a, 510a). As described previously, the remote services 508, 510 may correspond to various platforms or services including, without limitation, online vendors, content providers, software providers, collaboration systems, issue tracking systems, and other types of systems and platforms. Communication between the local client applications 504, 506 and a respective remote service 508, 510 is conducted via communications, 522, 524, which may include computerized networks using an HTTP or other communication protocol. While not expressly shown in FIG. 5, the microfunction 512 may also communicate with one or more remote systems, as described in more detail with respect to the previous examples.

In accordance with the examples provided herein, the microfunction 512 may perform a common or shared set of functions for multiple local client applications 504, 506. As described herein, the microfunction 512 may provide a common shopping cart application that is adapted to receive items or products from each of the local client applications 504, 506. The items or products collected in the shopping cart of the microfunction 512 may, in some implementations, be purchased using a shared electronic payment sequence. The shared items collected by the microfunction 512 may also be used to generate a shopping list, wish list, registry, or other similar item list, which may be used by another local client application or remote service.

As described herein, the microfunction 512 may provide a common electronic payment function that is shared by multiple local client applications 504, 506. As described herein, the microfunction 512 may initiate and/or manage an electronic funds transfer using a user-owned payment card or other payment account information. The microfunction 512 may also serve as a payment clearinghouse for receiving payments from one or more remote systems or local client applications 504, 506 on behalf of the user.

Further, as described herein, the microfunction 512 may perform a centralized user-authentication scheme that is leveraged or used by multiple local client applications 504, 506. As described previously, the microfunction 512 may be adapted to perform a single or multi-step authentication procedure, which may include receiving security codes, bio-authenticating information, or other data or information from the user. The microfunction 512 may also serve as a clearinghouse for passwords, authenticating tokens, encrypted keys, or other data used to provide access to data or functionality by one or both of the local client applications 504, 506. By centralizing these critical operations, adequate and consistent security features can be implemented across multiple local client applications 504, 506 while also reducing use of computing resources of the client device 502.

These operations and functions provided by the microfunction 512 are provided by way of example and are not intended to be limiting. The microfunction 512 may be used to perform a variety of functions and, as described herein, be used to render, generate, or otherwise direct a region or aspect of a graphical user interface of one or more of the local client applications 504, 506.

These foregoing embodiments depicted in FIGS. 3-5 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, it may be appreciated that data and/or information (including session keys, context keys, user input, user selections, context data/information, and any other suitable computer-readable data) may be exchanged between instances of applications executed by the same client device in a number of suitable ways, adhering to a number of suitable protocols, and/or complying with a number of suitable forms or formats.

Examples include, but are not limited to: storing at a persistent memory address by an instance of a first application data that may be retrieved at any suitable time (e.g., on demand, in response to an event report or notification, according to a schedule, and so on) by an instance of a second application; storing at a working memory address by an instance of a first application data that may be retrieved at any suitable time (e.g., on demand, in response to an event report or notification, according to a schedule, and so on) by an instance of a second application; generating an event to push to a system event queue by an instance of a first application in a format suitable to be recognized and consumed by an instance of a second application; via an inter-app communications protocol; via an inter-app messaging service; and so on. It may be appreciated that the foregoing examples are not exhaustive and that two instances of two different applications may suitably communicate in a number of different ways.

For example, in other cases, portions and/or all communications between two instances of applications executed by a client device may be facilitated in whole or in part by another service or instance of a service, either local or remote service, such as an instance of a third application executed by the client device and/or a remote service, such as a server or a separate electronic device or separate client device.

Figure 6:
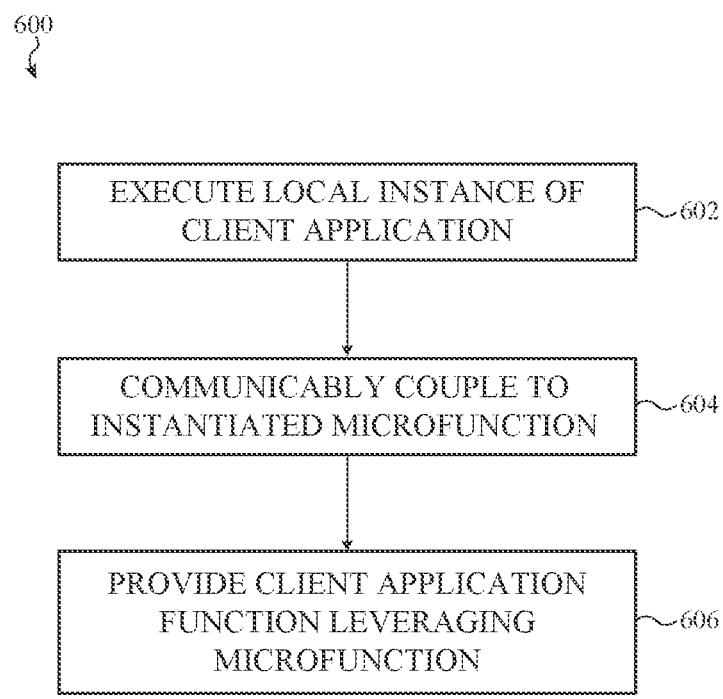
FIG. 6 depicts a flow diagram of an example process for implementing a microfunction on a client application.

FIG. 6 depicts a flow diagram of an example process for implementing a microfunction on a client application. FIG. 6 depicts an example process 600 that may be implemented using one or more of the systems described herein. In particular, the process 600 may be implemented using the systems 100, 200a, 200c, 300, 400, or 500 described above with respect to FIGS. 1, 2A, 2C, and 3-5.

In operation 602, an instance of a local application is executed. As described previously, the local application may be, what is referred to herein, as an integrated application that is adapted to operate in conjunction with one or more microfunctions. The local application may be stored in computer memory of a client device and instantiated in order to execute or run the local application. When executed, the local application may provide, what is referred to herein as service-specific functionality or operations, which may include functionality or operations that are not performed by the microfunction.

In operation 604, the client application is communicably coupled to one or more microfunctions. As described previously with respect to FIGS. 3-5, above, the client application or integrated application may communicate with an instantiated microfunction using one of a variety of communication techniques. In some instances, the client application and microfunction exchange are adapted to communicate using a local API, a local web communication scheme, or a communication link established by a plug-in or other similar technique. In some instances, the communication includes storing at a persistent memory address by an instance of a first application data that may be retrieved at any suitable time (e.g., on demand, in response to an event report or notification, according to a schedule, and so on) by an instance of a second application; storing at a working memory address by an instance of a first application data that may be retrieved at any suitable time (e.g., on demand, in response to an event report or notification, according to a schedule, and so on) by an instance of a second application; generating an event to push to a system event queue by an instance of a first application in a format suitable to be recognized and consumed by an instance of a second application; via an inter-app communications protocol; via an inter-app messaging service; and so on.

In operation 606, the client application provides functionality leveraging one or more of the instantiated microfunctions. As described previously, the client application may generate or render a graphical user interface having a region that is operated in accordance with or otherwise leverages functionality provided by the microfunction. As described above, the client application may perform service-specific functionality or operations. This service-specific functionality may operate in conjunction and/or in accordance with the previous examples, the microfunction may provide a region of the graphical user interface that enables shopping cart operations, an electronic payment operation(s), a centralized authentication or login operation, a module for providing access to or data from an issue tracking system, a collaboration system, or other system or platform. Example functionality and the resulting example graphical user interfaces are provided herein, specifically with respect to FIGS. 2A and 2C.

Figure 7:
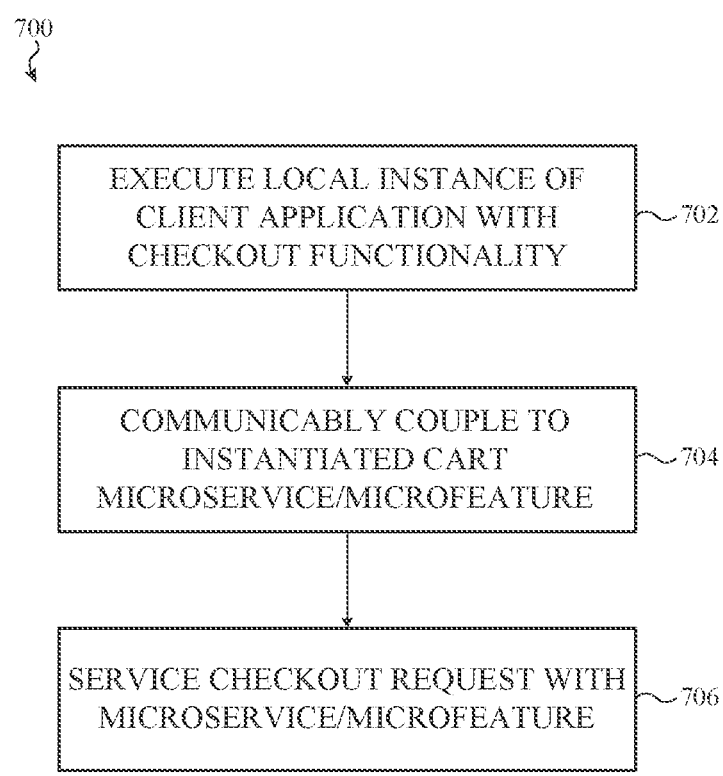
FIG. 7 depicts a flow diagram of an example process for implementing a shopping cart microfunction in a client application.

FIG. 7 depicts a flow diagram of an example process for implementing a shopping cart microfunction in a client application. FIG. 7 depicts an example process 700 that may be implemented using one or more of the systems described herein. In particular, the process 700 may be implemented using the systems 100, 200a, 200c, 300, 400, or 500 described above with respect to FIGS. 1, 2A, 2C, and 3-5.

In operation 702, a local instance of a client application is executed or instantiated. As described herein, a client application may include service-specific functionality or operations. The client application may serve as an interface to a marketplace, online retailer, content provider, or other system or platform adapted to provide various items for user consumption. While it is not necessary, the client application may include checkout functionality that allows a user to purchase or otherwise obtain the various items offered by the platform or system.

In operation 704, the client application is communicably coupled to an instantiated microfunction. Operation 704 may be performed in accordance with one or more of the techniques described herein for communicably coupling a client application or integrated application with a microfunction. With respect to this example, the client application may communicate data related to items that are selected by the user via the graphical user interface. The item data may include a SKU or other product identifier, a price, quantity selected, item vendor, and other item-related information. In response, the microfunction may collect and store information related to the various items selected by the user. As described herein, a single microfunction may receive items or item data from multiple client applications, and serve as a central shopping cart or collection point for multiple online vendors, marketplaces, or other similar platforms or services.

In operation 706, a checkout request is performed using the microfunction. In some implementations, a shopping cart microfunction may be used to perform checkout operations and complete a purchase of one or more items associated with the shopping cart. This may be implemented in one of a number of different ways. In a first example, the microfunction includes an electronic payment module or function that is adapted to receive payment information from the user and authorize a payment from a credit card issuer, bank, or other financial institution. In some implementations, the microfunction may collect a single payment and distribute the payment to the respective vendors or entities associated with the various items associated with the transaction. For example, as the microfunction is collecting or receiving items from various client applications, the microfunction may create an item transaction log that records the source of the items and a name of an entity associated with the item. When payment is authorized, the microfunction may use the item transaction log to identify respective entities associated with the purchased products and forward funds to the respective entities in response to the user purchase. The microfunction may also serve as a logistics clearinghouse and collect information about estimated shipping times, automatic reorders, item availability, and financial transaction history.

In another implementation of operation 706, the microfunction uses an external or client-specific payment module to facilitate a checkout process. For example, the microfunction may communicate with a payment service associated with each respective client application in order to facilitate the purchase of the various items. This scheme may be necessary if the various vendors are unable to receive funds from a centralized or common payment method (e.g., some vendors do not exchange funds with debit cards or perform other forms of payment). In yet another implementation, the shopping cart microfunction may use another electronic payment microfunction in order to facilitate the checkout and purchase of the various items.

Figure 8:
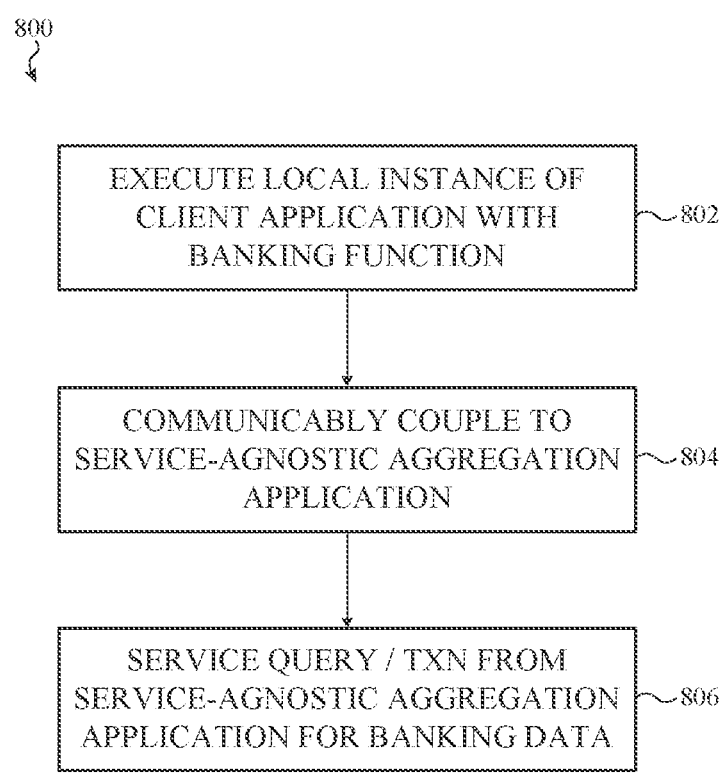
FIG. 8 depicts a flow diagram of an example process for implementing a financial micro-application service in a client application.

FIG. 8 depicts a flow diagram of an example process for implementing a financial micro-application service in a client application. FIG. 8 depicts an example process 800 that may be implemented using one or more of the systems described herein. In particular, the process 800 may be implemented using the systems 100, 200a, 200c, 300, 400, or 500 described above with respect to FIGS. 1, 2A, 2C, and 3-5.

In operation 802, a local instance of a client application is executed or instantiated. As described herein, a client application may include service-specific functionality or operations. The client application may serve as an interface to a bank, creditor, credit card issuer, or other financial institution. While it is not necessary, the client application may include financial functions that interface with a platform or system operated by one or more financial institutions.

In operation 804, the client application is communicably coupled to an instantiated microfunction (also referred to as a service-agnostic aggregation application). Operation 804 may be performed in accordance with one or more of the techniques described herein for communicably coupling a client application or integrated application with a microfunction. With respect to this example, the client application may communicate financial or payment data collected via the graphical user interface or from a related platform to the microfunction.

In operation 806, a query or transaction is performed by a microfunction. As described in various examples herein, a microfunction may be adapted to conduct or initiate a financial transaction in order to complete a purchase, transfer funds, or simply to obtain a balance or financial query. As described previously, a microfunction may be adapted to establish a secure gateway with an electronic payment processor or system. The processor may receive payment data and other information from the microfunction and relay information to a card network or issuer for account verification and approval. In response to the payment communication initiated by the microfunction, the issuer may authorize a respective bank or financial institution to transfer funds or credit to the appropriate recipient. The microfunction may also securely store various financial information, balances, transaction logs, and other potentially sensitive information using an encrypted storage system. The microfunction may then provide this information to one or more client applications, as needed, which may reduce data security risk.

Figure 9:
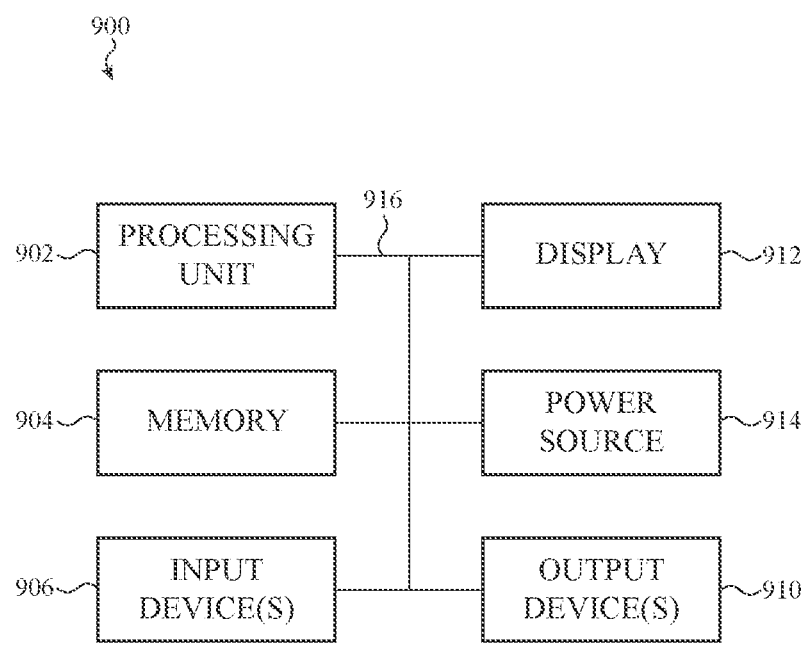
FIG. 9 depicts an example device.

FIG. 9 illustrates a sample electrical block diagram of an electronic device 900 that may perform the operations described herein. The electronic device 900 may in some cases take the form of any of the electronic devices described with reference to FIGS. 1-8, including client devices 102, 202a, 202c, 302, 402, 502, and/or servers or other devices associated with the issue tracking system 106, collaboration system 108, remote system 110, host server(s) 104, remote services 406, 508, 510. The electronic device 900 can include one or more of a display 912, a processing unit 902, a power source 914, a memory 904 or storage device, input devices 906, and output devices 910. In some cases, various implementations of the electronic device 900 may lack some or all of these components and/or include additional or alternative components.

The processing unit 902 (also referred to as a "processor") can control some or all of the operations of the electronic device 900. The processing unit 902 can communicate, either directly or indirectly, with some or all of the components of the electronic device 900. For example, a system bus or other communication mechanism 916 can provide communication between the processing unit 902, the power source 914, the memory 904, the input device(s) 906, and the output device(s) 910.

The processing unit 902 can be implemented as any electronic device capable of processing, receiving, or transmitting data or instructions. For example, the processing unit 902 can be a microprocessor, a central processing unit (CPU), an application-specific integrated circuit (ASIC), a digital signal processor (DSP), or combinations of such devices. As described herein, the terms "processing unit" or "processor" are meant to encompass a single processor or processing unit, multiple processors, multiple processing units, or other suitably configured computing element or elements.

It should be noted that the components of the electronic device 900 can be controlled by multiple processing units. For example, select components of the electronic device 900 (e.g., an input device 906) may be controlled by a first processing unit and other components of the electronic device 900 (e.g., the display 912) may be controlled by a second processing unit, where the first and second processing units may or may not be in communication with each other.

The power source 914 can be implemented with any device capable of providing energy to the electronic device 900. For example, the power source 914 may be one or more batteries or rechargeable batteries. Additionally or alternatively, the power source 914 can be a power connector or power cord that connects the electronic device 900 to another power source, such as a wall outlet.

The memory 904 can store electronic data that can be used by the electronic device 900. For example, the memory 904 can store electronic data or content such as, for example, audio and video files, documents and applications, device settings and user preferences, timing signals, control signals, and data structures or databases. The memory 904 can be configured as any type of memory. By way of example only, the memory 904 can be implemented as random access memory, read-only memory, Flash memory, removable memory, other types of storage elements, or combinations of such devices. The memory 904 may also include various forms of computer-readable memory that are configured to store executable software or computer code that, when executed by the processing unit 902, cause the device to perform one or more of the functions described herein.

In various embodiments, the display 912 provides a graphical output, for example associated with an operating system, user interface, and/or applications of the electronic device 900. In one embodiment, the display 912 includes one or more sensors and is configured as a touch-sensitive (e.g., single-touch, multi-touch) and/or force-sensitive display to receive inputs from a user. For example, the display 912 may be integrated with a touch sensor (e.g., a capacitive touch sensor) and/or a force sensor to provide a touch-and/or force-sensitive display. The display 912 is operably coupled to the processing unit 902 of the electronic device 900.

The display 912 can be implemented with any suitable technology, including, but not limited to, liquid crystal display (LCD) technology, light emitting diode (LED) technology, organic light-emitting display (OLED) technology, organic electroluminescence (OEL) technology, or another type of display technology. In some cases, the display 912 is positioned beneath and viewable through a cover that forms at least a portion of an enclosure of the electronic device 900.

In various embodiments, the input devices 906 may include any suitable components for detecting inputs. Examples of input devices 906 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 906 may be configured to detect one or more particular types of input and provide a signal (e.g., an input signal) corresponding to the detected input. The signal may be provided, for example, to the processing unit 902.

As discussed above, in some cases, the input device(s) 906 include a touch sensor (e.g., a capacitive touch sensor) integrated with the display 912 to provide a touch-sensitive display. Similarly, in some cases, the input device(s) 906 include a force sensor (e.g., a capacitive force sensor) integrated with the display 912 to provide a force-sensitive display.

The output devices 910 may include any suitable components for providing outputs. Examples of output devices 910 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device 910 may be configured to receive one or more signals (e.g., an output signal provided by the processing unit 902) and provide an output corresponding to the signal.

In some cases, input devices 906 and output devices 910 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 902 may be operably coupled to the input devices 906 and the output devices 910. The processing unit 902 may be adapted to exchange signals with the input devices 906 and the output devices 910. For example, the processing unit 902 may receive an input signal from an input device 906 that corresponds to an input detected by the input device 906. The processing unit 902 may interpret the received input signal to determine whether to provide and/or change one or more outputs in response to the input signal. The processing unit 902 may then send an output signal to one or more of the output devices 910, to provide and/or change outputs as appropriate.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A portable electronic device comprising:
    a display configured to render a graphical user interface;
    a persistent memory storing an executable asset; and
    a processor operably coupled to the persistent memory and configured to access the persistent memory to load at least a portion of the executable asset into a working memory to at least partially instantiate an instance of an integrated application, the instance of the integrated application communicably coupled to an issue tracking server of an issue tracking platform configured to track software issues, the instance of the integrated application configured to:
        display a first interface region of the graphical user interface, the first interface region associated with a first microfunction installed on the portable electronic device and directed to an interface for the issue tracking platform;
        display a second interface region of the graphical user interface, the second interface region associated with a second microfunction installed on the portable electronic device and directed to an interface for a collaboration platform configured to manage content created by a user group;
        receive a user input at the first interface region of the graphical user interface;
        in response to the user input, request the first microfunction to provide a function;
        receive a first response from the first microfunction;
        submit a request to the issue tracking server based on the first response from the first microfunction; and update the graphical user interface based at least in part on the first response from the first microfunction and a second response received from the issue tracking server.

2. The portable electronic device of claim 1, wherein:
the request is a first request; and
the instance of the integrated application is further configured to:
receive a second user input at the second interface region of the graphical user interface;
in response to the second user input, request the second microfunction to provide a second function;
receive a third response from the second microfunction;
submit a second request to a collaboration server of the collaboration platform based on the third response from the second microfunction; and
update the graphical user interface based at least in part on the third response from the second microfunction and a fourth response received from the collaboration server.

3. The portable electronic device of claim 2, wherein:
the processor is further configured to:
at least partially instantiate an instance of a first service-specific application that is configured to communicably couple to the issue tracking server;
at least partially instantiate an instance of a second service-specific application that is configured to communicably couple to the collaboration server;
the issue tracking server is configured to respond to both the first request provided by the first microfunction and a third request provided by the first service-specific application; and
the collaboration server is configured to respond to both a fourth request provided by the second microfunction and a fifth request provided by the second service-specific application.

4. The portable electronic device of claim 1, wherein:
the instance of the integrated application is a first instance of a first integrated application; and
the processor is further configured to at least partially instantiate a second instance of a second integrated application, the second instance of the second integrated application communicably coupled to the issue tracking server and configured to display a third interface region of a second graphical user interface, the third integrated region associated with the first microfunction installed on the portable electronic device.

5. The portable electronic device of claim 4, wherein:
the first instance of the first integrated application and the second instance of the second integrated application includes a third interface region associated with a third microfunction;
the third interface region is directed to a shopping cart interface to create a shopping cart having a list of user-selected items; and
the third microfunction is configured to receive user-selected items selected by a user operating either the first integrated application or the second integrated application.

6. The portable electronic device of claim 5, wherein the third microfunction is configured to initiate an electronic payment of the user-selected items.

7. A portable electronic device comprising:
a memory allocation configured to store at least three executable assets; and
a processor allocation operably coupled to the memory allocation and configured to access the memory allocation to load at least a portion of the at least three executable assets into a working memory allocation of the memory allocation to instantiate:
a first microfunction directed to a first interface to an issue tracking platform and configured to couple to a first host service including an issue tracking service of the issue tracking platform;
a second microfunction directed to a second interface for a collaboration platform and configured to couple to a second host service; and
an integrated application coupled to the first microfunction and the second microfunction, the integrated application configured to:
generate a first request to the first microfunction for first data received from the first host service, the first request for an issue status of an issue tracked by the issue tracking platform;
generate a second request to the second microfunction for second data received from the second host service; and
render a graphical user interface comprising third data based at least in part from the first data and the second data.

8. The portable electronic device of claim 7, wherein:
the integrated application is configured to communicably couple to a third host service to receive fourth data; and
the third data is based at least in part on the first data, the second data, and the fourth data.

9. The portable electronic device of claim 7,
the processor allocation is further configured to instantiate a first service-specific client application and a second service-specific client application;
the first service-specific client application is configured to couple to the first host service; and
the second service-specific client application is configured to couple to the first host service.

10. A method for providing shared resource allocations in a portable electronic device, the method comprising:
creating a microfunction instance defined by a configuration file, the microfunction instance configured to provide an issue tracking service and provides an interface to an issue tracking platform;
instantiating a first integrated application;
communicably coupling the first integrated application to the microfunction instance;
instantiating a second integrated application;
communicably coupling the second integrated application to the microfunction instance; and
executing the microfunction instance to provide a function to both the first integrated application and the second integrated application wherein:
the microfunction instance is configured to issue a request to the issue tracking service of the issue tracking platform as part of the issue tracking service and provide data received from the issue tracking service; and
the first and second integrated applications are coupled to the issue tracking service by the microfunction instance.

11. The method of claim 10, wherein:
the first integrated application is configured to display a first graphical user interface on a display of the portable electronic device;
the second integrated application is configured to display a second graphical user interface on the display of the portable electronic device; and the microfunction instance provides a first interface region in the first graphical user interface and the second graphical user interface.

12. The method of claim 10, wherein:
the microfunction instance is a first microfunction instance;
the method further comprises creating a second microfunction instance configured to provide a service;
the second microfunction instance includes an interface to a collaboration platform;
the service is a user authentication interface;
the second microfunction instance is configured to authenticate a user of the portable electronic device; and
the first and second integrated applications enable access to respective application functionality in response to an authentication performed by the second microfunction instance.

13. The method of claim 12, wherein:
the second microfunction instance includes the interface to the collaboration platform;
the second microfunction instance provides a second service including displaying a user comment field;
the second microfunction instance is configured to obtain a set of user comments provided by the collaboration platform; and
the first and second integrated applications are configured to display the set of user comments obtained by the second microfunction instance.

14. The method of claim 10, wherein:
the microfunction instance is a first microfunction instance;
the method further comprises creating a second microfunction instance configured to provide an electronic shopping cart interface;
the second microfunction instance is configured to track a list of user-selected items; and
a first portion of the list of user-selected items is received from the first integrated application; and
a second portion of the list of user-selected items is received from the second integrated application.

15. The method of claim 14, wherein:
the first integrated application is configured to display a first graphical user interface on a display of the portable electronic device;
the second integrated application is configured to display a second graphical user interface on the display of the portable electronic device; and
the second microfunction instance provides a shopping cart interface in the first graphical user interface and the second graphical user interface.

16. The method of claim 14, wherein the second microfunction instance is configured to initiate an electronic payment for the list of user-selected items.

17. The method of claim 16, wherein the second microfunction instance is configured to establish a payment gateway with a remote service.

* * * * *